United States Patent
Koskela et al.

(10) Patent No.: US 12,022,344 B2
(45) Date of Patent: Jun. 25, 2024

(54) CELL RANKING IN MULTI BEAM SYSTEM

(71) Applicant: NOKIA TECHNOLOGIES OY, Espoo (FI)

(72) Inventors: Timo Koskela, Oulu (FI); Jorma Kaikkonen, Oulu (FI); Jedrzej Stanczak, Wroclaw (PL); Samuli Turtinen, Ii (FI); Jarkko Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/546,485

(22) Filed: Dec. 9, 2021

(65) Prior Publication Data

US 2022/0104086 A1 Mar. 31, 2022

Related U.S. Application Data

(63) Continuation-in-part of application No. 16/610,515, filed as application No. PCT/IB2018/054563 on Jun. 20, 2018, now Pat. No. 11,856,467, and a continuation-in-part of application No. 15/586,227, filed on May 3, 2017, now Pat. No. 11,223,403.

(60) Provisional application No. 62/524,834, filed on Jun. 26, 2017, provisional application No. 62/332,229, filed on May 5, 2016.

(51) Int. Cl.
*H04W 36/00* (2009.01)

(52) U.S. Cl.
CPC .............................. *H04W 36/00837* (2018.08)

(58) Field of Classification Search
CPC . H04W 16/28; H04W 24/10; H04W 36/0085; H04W 36/30; H04W 36/32; H04W 72/04; H04W 36/00835; H04W 36/00837
USPC .......................................... 370/329, 331, 338
See application file for complete search history.

(56) References Cited

U.S. PATENT DOCUMENTS

| | | | |
|---|---|---|---|
| 6,438,389 | B1 | 8/2002 | Sandhu et al. |
| 2002/0012380 | A1 | 1/2002 | Hottinen et al. |

(Continued)

FOREIGN PATENT DOCUMENTS

| | | |
|---|---|---|
| CN | 103493536 A | 1/2014 |
| CN | 106488472 A | 3/2017 |

(Continued)

OTHER PUBLICATIONS

Non-Final Office Action for U.S. Appl. No. 16/610,515 dated Jun. 9, 2022.

(Continued)

*Primary Examiner* — Harun Chowdhury
(74) *Attorney, Agent, or Firm* — ALSTON & BIRD LLP

(57) ABSTRACT

In accordance with an example embodiment, there is disclosed a method comprising: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality.

20 Claims, 10 Drawing Sheets

(56) References Cited

U.S. PATENT DOCUMENTS

| | | | |
|---|---|---|---|
| 2005/0176385 A1 | 8/2005 | Stern-Berkowitz et al. | |
| 2005/0202859 A1 | 9/2005 | Johnson et al. | |
| 2010/0216455 A1* | 8/2010 | Kazmi | H04W 36/30 455/424 |
| 2014/0010142 A1 | 1/2014 | Ranta-Aho et al. | |
| 2015/0049824 A1 | 2/2015 | Kim et al. | |
| 2015/0222345 A1 | 8/2015 | Chapman et al. | |
| 2016/0095102 A1 | 3/2016 | Yu et al. | |
| 2016/0150435 A1 | 5/2016 | Baek et al. | |
| 2016/0262077 A1* | 9/2016 | Zhang | H04W 36/0085 |
| 2017/0006539 A1 | 1/2017 | Kakishima et al. | |
| 2017/0208494 A1 | 7/2017 | Moon et al. | |
| 2017/0215117 A1 | 7/2017 | Kwon et al. | |
| 2019/0173533 A1 | 6/2019 | Kim et al. | |
| 2019/0268782 A1* | 8/2019 | Martin | H04W 36/32 |

FOREIGN PATENT DOCUMENTS

| | | |
|---|---|---|
| EP | 2198635 A1 | 6/2010 |
| GB | 2 516 463 A | 1/2015 |
| WO | WO 2009/046776 A1 | 4/2009 |
| WO | WO 2015/141071 A1 | 9/2015 |
| WO | WO 2016/085266 A1 | 6/2016 |
| WO | WO 2016/138655 A1 | 9/2016 |
| WO | WO 2016/163786 A1 | 10/2016 |
| WO | WO 2018/080723 A1 | 5/2018 |
| WO | WO 2018/082904 A1 | 5/2018 |

OTHER PUBLICATIONS

Office Action for Chinese Application No. 201880038880.8 dated Jun. 2, 2022, 10 pages.
"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.1.0, Mar. 2016, pp. 1-551.
"3rd Generation Partnership Project; Technical Specification Group Radio Access Network; Requirements for support of radio resource management (TDD) (Release 13)", 3GPP TS 25.123 v13.0.0, (Jan. 2016), 454 pages.
"3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 13)", 3GPP TS 36.300, V13.3.0, Mar. 2016, pp. 1-295.
"3rd Generation Partnership Project; Technical Specification Group Radio Access Network; New Generation Radio Access Network; User Equipment (UE) procedures in Idle mode (Release 15)", 3GPP TS 38.304, V0.0.3, May 2017, pp. 1-12.
"3rd Generation Partnership Project; Technical Specification Group Radio Access Network;Evolved Universal Terrestrial Radio Access (E-UTRA); User Equipment (UE) procedures in idle mode (Release 14)", 3GPP TS 36.304, V14.2.0, Mar. 2017, pp. 1-49.

"Cell Re-Selection Measurement Window", 3GPP TSG-RAN WG2 #98, Tdoc R2-1705436, Agenda: 10.4.2.2, Ericsson, May 15-19, 2017, pp. 1-4.
"Derivation of Cell Quality in Idle/Inactive", 3GPP TSG-RAN WG2 Meeting #98, R2-1704896, Agenda: 10.4.2.2, Huawei, May 15-19, 2017, 2 pages.
"Derivation of Cell Quality in Idle/Inactive", 3GPP TSG-RAN WG2 Meeting #98, R2-1705435, Agenda: 10.4.2.2, Ericsson, May 15-19, 2017, 3 pages.
International Search Report and Written Opinion received for corresponding Patent Cooperation Treaty Application No. PCT/IB2018/054563, dated Nov. 19, 2018, 15 pages.
Extended European Search Report received for corresponding European Patent Application No. 18825195.3, dated Feb. 2, 2021, 10 pages.
Extended European Search Report for European Application No. 17169373.2 dated Aug. 9, 2017, 10 pages.
Office Action for European Application No. 17169373.2 dated Jun. 21, 2019, 5 pages.
Office action received for corresponding Chinese Patent Application No. 201880038880.8, dated Jun. 3, 2021, 4 pages of office action and 4 pages of Translation available.
Office Action for Chinese Application No. 201880038880.8 dated Jan. 27, 2022, 16 pages.
Advisory Action for U.S. Appl. No. 15/586,227 dated Jul. 29, 2021.
Advisory Action for U.S. Appl. No. 15/586,227 dated Jul. 6, 2020.
Advisory Action for U.S. Appl. No. 15/586,227 dated Jul. 30, 2019.
Final Office Action for U.S. Appl. No. 15/586,227 dated May 14, 2021.
Final Office Action for U.S. Appl. No. 15/586,227 dated Mar. 9, 2020.
Final Office Action for U.S. Appl. No. 15/586,227 dated Apr. 9, 2019.
Non-Final Office Action for U.S. Appl. No. 15/586,227 dated Dec. 9, 2020.
Non-Final Office Action for U.S. Appl. No. 15/586,227 dated Nov. 12, 2019.
Non-Final Office Action for U.S. Appl. No. 15/586,227 dated Dec. 10, 2018.
Notice of Allowance for U.S. Appl. No. 15/586,227 dated Sep. 7, 2021.
Office Action for European Application No. 18825195.3 dated Nov. 30, 2022, 6 pages.
Extended European Search Report for European Application No. 22160241.0 dated May 19, 2022, 6 pages.
Final Office Action for U.S. Appl. No. 16/610,515 dated Mar. 6, 2023.
Advisory Action for U.S. Appl. No. 16/610,515 dated May 8, 2023.
Board Opinion for Chinese Application No. 201880038880.8 dated Jun. 21, 2023, 14 pages.
Board Opinion for Chinese Application No. 201880038880.8 dated Oct. 8, 2023, 6 pages.

* cited by examiner

CELL RANKING IN MULTI BEAM SYSTEM

CROSS-REFERENCE TO RELATED APPLICATIONS

This application is a continuation-in-part of U.S. application Ser. No. 16/610,515, which is the national phase entry of PCT Application No. PCT/M2018/054563, filed Jun. 20, 2018, which claims priority to U.S. Provisional Application No. 62/524,834, filed Jun. 26, 2017, the entire contents of each of which are incorporated herein by reference. This application is also a continuation-in-part of U.S. application Ser. No. 15/586,227, filed May 3, 2017, which claims priority to U.S. Provisional Application No. 62/332,229, filed May 5, 2016, the entire contents of each of which are incorporated herein by reference.

TECHNICAL FIELD

Determination of characteristics of a communication environment may be beneficial in many communication systems. For example, certain wireless communication systems, such as fifth generation (5G) communication systems, long term evolution advanced (LTE-A), and wireless local area network (WLAN) may benefit from appropriate mobility measurements.

This invention relates generally to New Radio (NR) and, in particular, to improving performance of intra-frequency cell ranking in a multibeam system in a UE-based mobility environment.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section.

5G radio access systems may include a variety of different transceiver architectures: digital, analog, or hybrid baseband processing. Hybrid baseband processing can use a hybrid of digital baseband processing, such as Multiple Input Multiple Output (MIMO) and/or digital precoding. Although some aspects of certain embodiments of the present invention may be discussed in the context of analog beamforming, namely a fully analog or hybrid transceiver, the same principles may be similarly applied to digital beamforming transceiver architectures, and to any other beamforming architectures.

Beamforming can be used for many purposes. For example, beamforming can be used to compensate for increased path loss when operating on higher frequencies while providing cell coverage. Transceiver architectures can implement beamforming. The choice of transceiver architecture may depend on cost and complexity limitations. As an example, systems deployed to lower frequencies, such as below 6 GHz, may be implemented by using a fully digital architecture. It should be appreciated that the indicated cut-off frequency is merely artificial and provided as an example. By contrast, in systems with higher frequencies the number of antenna elements required for cell coverage may range from tens to hundreds (to provide sufficient antenna array gain) and may be implemented using a hybrid-architecture, or even a fully analog architecture. Additionally as a single beam may cover only a part of a coverage area or coverage volume, multiple beams may be sequentially applied to cover the area or volume.

FIG. 1 illustrates a sweeping sub-frame. In 5G, a sweeping sub-frame may provide coverage for common control channel signaling with beamforming. A sweeping sub-frame can include sweeping blocks (SB). A single block can cover a specific area or volume of the cell with a set of active beams.

Thus, a sweeping sub-frame is illustrated in FIG. 1. The total number of beams required to cover a required cell area may be much larger than the number of concurrent active beams the access point is able to form. Therefore the access points may sweep through the cell coverage area in the time domain by activating a different set of beams on each SB. Depending on the number of active beams per sweep block and the total number of beams required to cover a cell area (which may range from tens to hundreds to cover all the directions in azimuth and elevation), multiple sweep blocks may be needed. Also, the number of sweep blocks per sub-frame may be limited by the length of each sweep. As an example, one SB duration may be one or two symbols of orthogonal frequency division multiplexing (OFDM). Thus, if there are 14 symbols per sub-frame, the sweeping sub-frame may be able to accommodate 7 SBs (if 2 symbols are used). Depending on the number of SBs required to cover a cell, multiple sweeping sub-frames may be needed.

The active beam depicted in the FIG. 1 may be used for either transmitting or receiving information. Thus the sweeping sub-frame may be a downlink sweeping sub-frame or an uplink sub-frame. Further, assuming a time division duplex (TDD) system and reciprocity between downlink and uplink channels, essentially the same SBs need to be defined on uplink and downlink direction to cover cell area on uplink and downlink direction with same beam configurations per sweeping block.

As an example, if downlink common control channel coverage is provided by the sweeping sub-frame, each SBs can carry essential cell access information such as downlink (DL) synchronization signals, system information such as master information block (MIB), system information block (SIB) or the like (including PRACH/RACH configurations), also paging (or any control information that needs to be broadcasted in a cell). In the uplink direction the sweeping sub-frame/sub-frames may accommodate resources for random access channel or other uplink channels requiring periodic availability such as scheduling request (SR) or sounding reference signal (SRS).

In a beam-formed system in which cell coverage is provided by multiple beams, it may be beneficial to identify a single beam. Such identification may be performed, for example, by using beam specific reference signals, which enable a user equipment (UE) to perform beam level detection/separation. The UE may also detect multiple beams: the radiation patterns of different beams typically overlap to provide solid coverage throughout the cell. Also the beam radiation patterns may have a high level of directivity in the direction of the main lobe but may also radiate meaningful amounts of energy to other directions as well (typically these are called side lobes and back lobe). Detection or separation of beams may be beneficial in some cases, such as when a UE indicates to the network the preferred communication beam or beams during A single beam in a sweep block can be identified, for example, by using beam specific reference signals enabling a user equipment (UE) to perform beam level detection/separation. These reference signals can be associated to beams and an identifier can be given to a specific beam separated by the reference signal. The beam specific reference symbols can be reused in the next SB but the SB identifier can be used to separate beams of different SB s. The SB identifier may be explicitly signaled in each SB or calculated by using time domain mapping to a known time reference, or otherwise provided. Thus, one way to calculate a beam identifier may be simply to calculate Beam RS_ID*Sweep_Block_ID. If only one beam is active per sweep block the sweep block identifier can also identify the beam. This situation in which only one beam is active per sweep block may arise when, for example, an access point is able to form only one beam or alternatively sends only one reference signal using multiple beam patterns.

Also the beam may have a few alternative definitions. One way to express a beam is to identify a beam based on beam specific reference signal. Thus different beams can be separated by detecting different beam specific reference signals. These reference signals can be measured so that a quality value such as reference signal received power (RSRP) or reference signal received quality (RSRQ) can be determined. Alternatively or additionally measurements can also be made from channel state information-reference signals (CSI-RS), demodulation reference signals (DM-RS) for data or for control, or the like. Some of these different reference signals may be periodically transmitted, such signals may be present only when data or control is transmitted, or such signals may be transmitted when scheduled or triggered as per UE request.

Alternatively, one beam may be defined as a so-called polarization pair so that a beam specific reference signal (BRS) is transmitted simultaneously by using two beams pointing in the same direction. For example, radiation patterns can overlap as the beams may have equal weighting for antenna elements. The antenna elements of the first beam can provide vertical polarization for the signal and the elements of the second beam can provide horizontal polarization. Thus, in this case the receiver may see only one BRS signal.

If specific BRS is transmitted using multiple beams, the UE may see the multiple beams as one beam, as the UE only detects one BRS over the beams. Thus a detection of a BRS can define a beam. This applies for both analog and digital beamforming.

Furthermore, BRS signals may be derived by using a cell identifier thus different BRS signals from different cells can be separated and measured by a receiver and linked to a said cell specific identifier.

FIG. 2 illustrates measurement reporting. FIG. 2 is based on 3GPP technical specification (TS) 36.300, Overall description; Stage 2: Chapter 10.6 Measurement Model. As shown in FIG. 2, at A there can be measurements or samples internal to the physical layer. Layer 1 filtering can be applied to the inputs measured at point A. This layer 1 filtering can be, for example, taking an average of several measured reference symbols.

At B there can be a measurement reported by layer 1 to layer 3 after layer 1 filtering. Then, there can be layer 3 filtering performed on the measurements provided at point B. The behavior of the Layer 3 filters can be standardized and the configuration of the layer 3 filters can be provided by radio resource control (RRC) signaling Filtering reporting period at C can equal one measurement period at B.

At C there can be a measurement after processing in the layer 3 filter. The reporting rate can be identical to the reporting rate at point B. This measurement can be used as input for one or more evaluation(s) of reporting criteria.

Evaluation of reporting criteria can check whether actual measurement reporting is necessary at point D. Then, if so, at D a measurement report information message can be sent on the radio interface.

3GPP TS 36.331 RRC Specification 5.5.4 Measurement report triggering, describes how measurement reporting can be triggered. As described there, LTE measurement report trigger events can include the following: A1 Serving becomes better than threshold; A2 Serving becomes worse than threshold; A3 Neighbor becomes offset better than primary cell (PCell); A4 Neighbor becomes better than threshold; A5 PCell becomes worse than threshold1 and neighbor becomes better than threshold2; A6 Neighbor becomes offset better than secondary cell (SCell); C1 channel state information reference signals (CSI-RS) resource becomes better than threshold; C2 CSI-RS resource becomes offset better than reference CSI-RS resource; B1 Inter radio access technology (RAT) neighbor becomes better than threshold; and B2 PCell becomes worse than threshold1 and inter RAT neighbor becomes better than threshold2.

In NR, a UE determines the cell quality level (e.g. RSRP (dBm), RSRQ (dB)) based on beam measurements. These measurement quantities can be based on measurement done on signals encompassed in SS block (in IDLE and in RRC_INACTIVE), namely on SSS and/or PBCH DMRS. The SS block can be transmitted to one beam, the SS block can be superposed on multiple beams, and/or different SS blocks can be sent on different beams. In CONNECTED mode a UE may measure the quality in addition to SS block signals, based on CSI-RS (for beam management, sometimes called intra-cell mobility and/or L3 mobility, or cell level mobility) configured to the UE. In some cases UE may also measure CSI-RS (or any reference signals for mobility purposes also in IDLE/INACTIVE).

Several papers on the subject have been submitted to 3GPP RAN2 #98 (May 2017) but, according to the Chairman notes, were not treated (a related discussion was expected at the next RAN2 meeting). For example, Huawei (in R2-1704896 Derivation of cell quality in IDLE/INACTIVE, Huawei, HiSilicon, 3GPP TSG-RAN WG2 Meeting #98, Hangzhou, China, 15-19 May 2017) proposed a method to derive cell quality in RRC_Idle/RRC_Inactive mode, wherein a method would be to simply average multiple beams to derive cell-level quality. However, by performing such a step, information that would be lost includes the per beam quality and the information about the actual number of beams (or "good beams") per cell, which are of paramount importance and not neglected in the procedure disclosed by the invention herein.

Ericsson (in R2-1705436 Derivation of cell quality in IDLE/INACTIVE, Ericsson, 3GPP TSG-RAN WG2 Meeting #98, Hangzhou, China, 15-19 May 2017) also touched upon the topic, but without proposing any specific procedure, focusing more on the value of N (i.e. the number of beams) and suggesting considering a relative threshold (i.e. offset), rather than an absolute threshold.

The current invention moves beyond the current techniques and/or materials.

Acronyms or abbreviations that may be found in the specification and/or the drawing figures are defined within the context of this disclosure or as follows below:
3GPP Third Generation Partnership Project
5G 5th Generation
ACK Acknowledgement
AR Augmented Reality
CSI-RS Channel State Information-Reference Signals DCI Downlink Control Information
DL Downlink
DL-SCH Downlink Shared Channel
DMRS Demodulation Reference Signal
eNB or eNodeB base station, evolved Node B
FFS For Further Study
gNB NR/5G Node B
HO Handover
HARQ Hybrid Automatic Repeat Request
L1 Layer 1
L2 Layer 2
L3 Layer 3
LTE Long Term Evolution
LTE-A Long Term Evolution-Advanced
LVL Level
MBB Mobile Broadband
MME Mobility Management Entity
MSG Message
NACK Negative Acknowledgement
NCE Network Control Entity
NR New Radio
NW Network
OFDM Orthogonal Frequency Division Multiplexing
PBCH Physical Broadcast Channel
PDCCH Physical Downlink Control Channel
PDSCH Physical Downlink Shared Channel
PRACH Physical Random Channel
PRB Physical Resource Block
PSS Primary Synchronization Signal
PUCCH Physical Uplink Control Channel
PUSCH Physical Uplink Shared Channel
RACH Random Access Channel
RA Resource Allocation
RAR Random Access Response
RAT Radio Access Technology
RB Resource Block
Rel Release
RE Resource Element
RS Reference Signal
RSRP Reference Signal Received Power
RSRQ Reference Signal Received Quality
RRC Radio Resource Control
RV Redundancy Version
RX Reception
SS Synchronization Signal
SSS Secondary Synchronization Signal
TB Transport Block
TS Technical Specification
TRP Transmission reception point
TTI Transmission Time Interval
TTT Time To Trigger
UE User Equipment
TX Transmission
UCI Uplink Control Information
UE User Equipment
UL Uplink

SUMMARY

Various aspects of examples of the invention are set out in the claims.

According to a first aspect of the present invention, an apparatus comprising at least one processor and at least one memory including computer program code, wherein the at least one memory and the computer program code are configured to, with the at least one processor, cause the apparatus to at least: receive beam information from a serving cell and each neighboring cell; assess a beam quality of the serving cell and each neighboring cell from the information; determine a subset of the serving cell and neighboring cells comprising the serving cell and each neighboring cell with a beam quality within a first offset of the serving cell and each neighboring cell with a highest quality beam; rank each cell of the subset in descending order from highest to lowest quality; calculate, firstly, a reception level of the strongest cell minus a second offset for a duration of a first time-to-trigger and, secondly, a reception level of the strongest cell minus the second offset for a duration of a second time-to-trigger; compare reception levels of beams from each ranked cell to the first calculation and second calculation; advance the order of each ranked cell per beam with a reception level greater than: the first calculation by a first grade, the second calculation by a second grade, and an equally ranked cell by a fractional grade; select a cell having a highest order.

According to a second aspect of the present invention, a method comprising: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality; calculating, firstly, a reception level of the strongest cell minus a second offset for a duration of a first time-to-trigger and, secondly, a reception level of the strongest cell minus the second offset for a duration of a second time-to-trigger; comparing reception levels of beams from each ranked cell to the first calculation and second calculation; advancing the order of each ranked cell per beam with a reception level greater than: the first calculation by a first grade, the second calculation by a second grade, and an equally ranked cell by a fractional grade; selecting a cell having a highest order.

According to a third aspect of the present invention, a computer program product comprising a non-transitory computer-readable medium bearing computer program code embodied therein for use with a computer, the computer program code comprising code for: receiving, by a user equipment in a wireless network, beam information from a serving cell and each neighboring cell; assessing a beam quality of the serving cell and each neighboring cell from the information; determining a subset of the serving cell and neighboring cells comprising the serving cell and each neighboring cell with a beam quality within a first offset of the serving cell and each neighboring cell with a highest quality beam; ranking each cell of the subset in descending order from highest to lowest quality; calculating, firstly, a reception level of the strongest cell minus a second offset for a duration of a first time-to-trigger and, secondly, a reception level of the strongest cell minus the second offset for a duration of a second time-to-trigger; comparing reception levels of beams from each ranked cell to the first calculation and second calculation; advancing the order of each ranked cell per beam with a reception level greater than: the first calculation by a first grade, the second calculation by a second grade, and an equally ranked cell by a fractional grade; selecting a cell having a highest order.

DETAILED DESCRIPTION OF DRAWINGS

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

Certain embodiments address an issue of determining cell quality for evaluating reporting criteria in a system utilizing, for example, analog and hybrid beamforming. UE may detect one or multiple beams per cell at one time instance and, for example, the received power levels per beam may vary fast over a short period of time. In current cellular systems, such as GERAN, UTRAN, and E-UTRAN, the UE filters different measurement samples from single cell based on reference/pilot symbols. The reference/pilot symbols are sent to the complete cell coverage in those systems. Therefore, current filtering mechanisms involve all samples from a cell being averaged together can compared to cell-based criteria to determine when to trigger measurement reports. By contrast, certain embodiments may address a situation in which beam-specific measurement reporting may be desired, and when averaging across an entire cell may not be desired even for cell-based reporting.

Further, certain embodiments address reporting criteria evaluation for intra cell mobility, such as beam level mobility in a cell. For example, a UE may move out of the coverage area of, or be obstructed from, a beam but may also detect one or more other beams during the measurement period.

Figure 1:
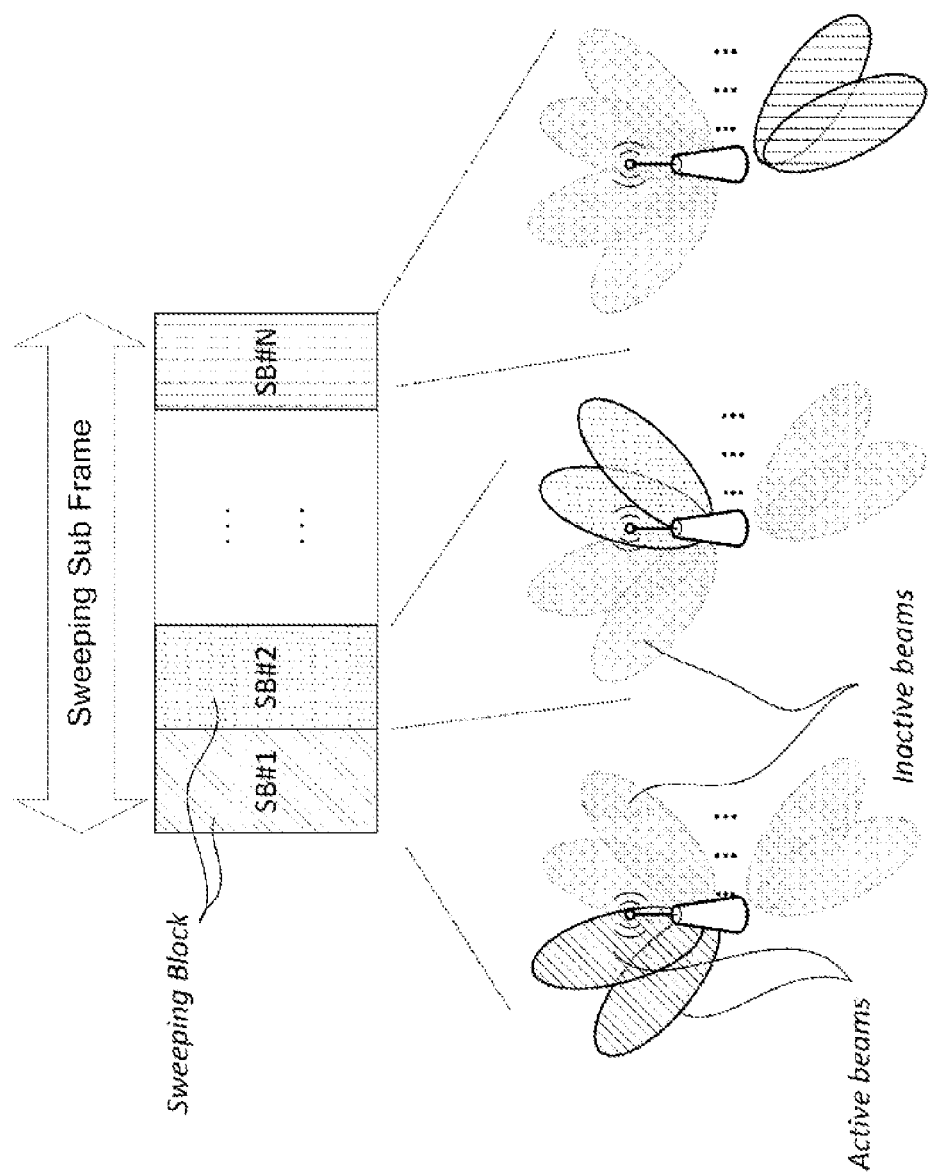
FIG. 1 illustrates a sweeping sub-frame.
Figure 2:
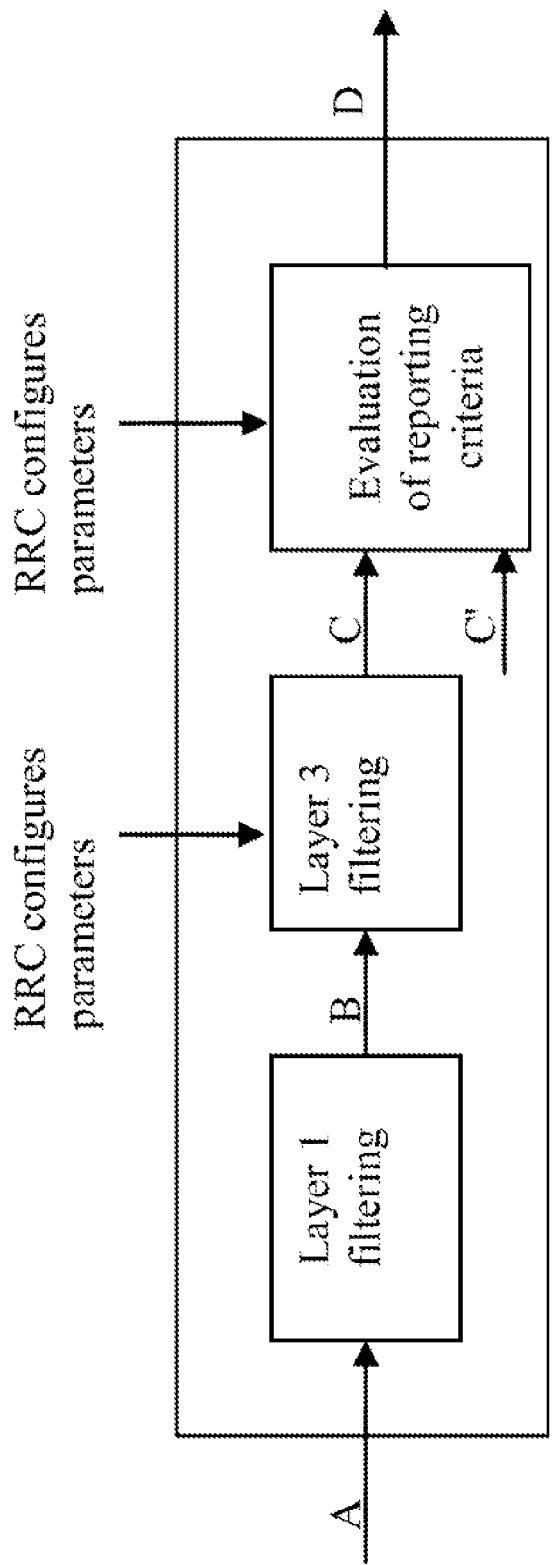
FIG. 2 illustrates measurement reporting.
Figure 3:
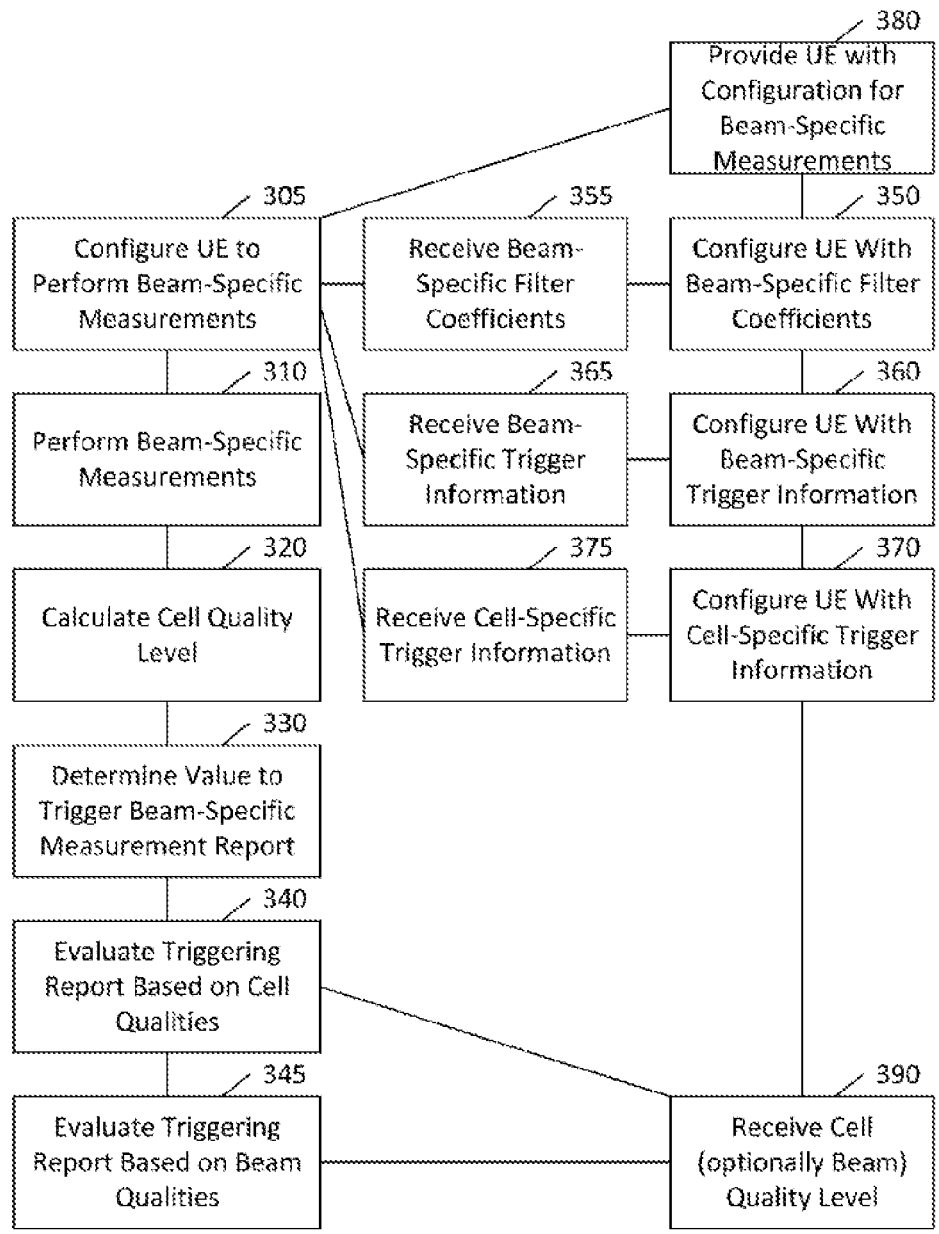
FIG. 3 illustrates a method according to certain embodiments.

FIG. 3 illustrates a method according to certain embodiments. As shown in FIG. 3, a method can include, at 310 performing beam-specific measurements of a plurality of beams of cell. The method can also include, at 320, calculating a cell quality level based on the beam-specific measurements. The method can additionally, at 305, include configuring a UE to perform the beam-specific measurements.

This configuring of the UE can be done with respect to a beam-formed system. Moreover, the configuration can configure the UE to perform beam specific L1 measurements (and may apply also L1 filtering such as linear average of measurements performed on reference signals/symbols over the measured frequency band) and higher layer filtering (L2/L3) of physical layer measurements of the beam specific samples, and to calculate a cell quality level based on the filtered beam specific samples. Thus, in certain embodiments a cell quality level may take into account beam specific samples, rather than treating the cell as a single beam. Such higher layer filtering may be, but not limited to, so-called 'moving average' filtering where previous filtered measurement result is weighted with weight_1 and the latest received measurement result is weighted with weight_2. There may be interdependency between the weights. For example, weight_1=alpha and weight_2=1-alpha is one possible interdependent weighting scheme.

The method can also include, at 330, determining a value to trigger a measurement report with a beam-specific measurement. This determination may include, for example, determining criteria values to trigger a specific measurement report with beam specific measurements.

The method can further include, at 340, evaluating whether to trigger a measurement report based on cell qualities, and at 345, evaluating whether to trigger a measurement report based on beam qualities. Thus, for each measurement period, there can be a separate evaluation of the criteria for triggering a measurement report based on the calculated cell qualities and serving cell(s) beam qualities.

The method can additionally include, performing a first level of higher layer filtering of beam specific samples and evaluating measurement report trigger at L2 (e.g. MAC layer, triggering MAC level measurement report based on beam qualities), performing a second level of higher layer filtering and evaluating criteria for triggering report based on cell qualities at layer 3 (RRC, triggering RRC measurement report). Also any other combinations are possible such as performing first and second level filtering on L2 (triggering respective L2 measurement reports) or L3 (triggering respective L3 measurement reports). The first and second stage filtering may be performed on the same protocol layer (L3, RRC) or in different layers L2 and L3 so that first stage is on L2 and the second stage is L3. Also each layer may have its own respective report formats and reported object (beam, cell). Alternatively or additionally the first stage of higher layer filtering may be implemented also to be part of the L1 filtering.

The method can additionally include, at 350, a network element configuring the user equipment with beam-specific higher layer filter coefficients. This configuration can be received at the user equipment a 355. The beam specific higher layer filter coefficients can be used in the process of, for example, averaging different measurement samples from each of the beams.

The method can further include, at 360, a network element configuring the user equipment with beam-specific trigger information. This configuration can be received by the user equipment at 365. This first trigger (Tbeam) can trigger measurement report and UE actions to send measurement based on the serving cell individual beams quality.

The method can also include, at 370, a network element configuring the user equipment with cell-specific trigger information. This configuration can be received by the user equipment at 375. This second trigger value (Tcell) can trigger measurement report and UE actions to send measurement report based on serving cell and neighbor cell quality.

Thus, the method can include, at 380, providing a user equipment with a configuration for beam-specific measurements. This providing can include the various configurations at 350, 360, and 370, described above. The configuration can be the configuration applied at 305, described above. Moreover, the method can include receiving, at 390, cell level quality, and optionally also beam level quality, from the user equipment.

Figure 4:
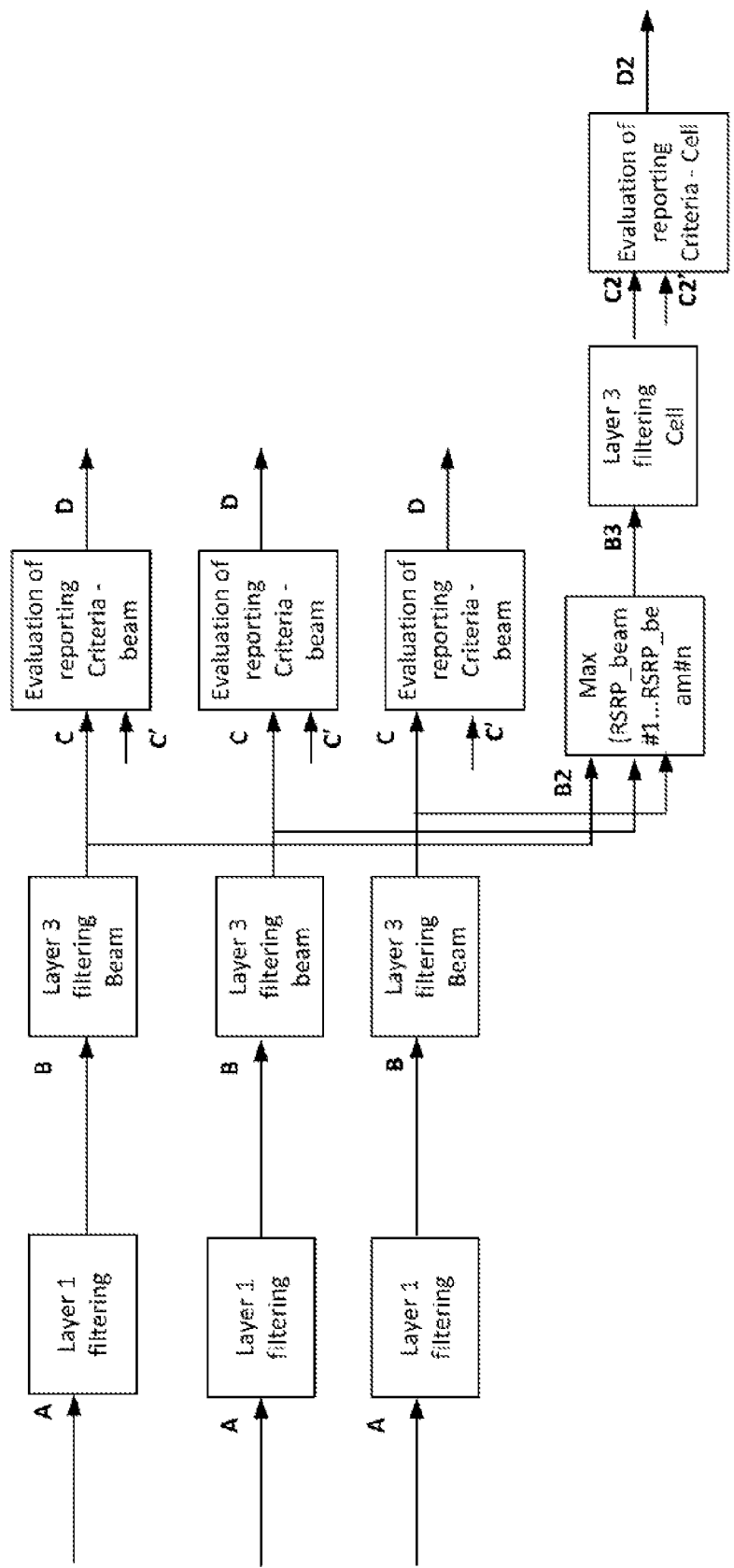
FIG. 4 illustrates measurement reporting, according to certain embodiments.

FIG. 4 illustrates measurement reporting, according to certain embodiments. Calculation of cell quality value may be determined by measuring first beam specific samples of at least one of the following RSRP, RSRQ, CQI or the like, point A in FIG. 4. In the figure one instance of point A represents a measured sample of a single beam. For the raw physical layer measurement samples UE may perform L1 filtering such as linear average of received power over measured reference signals (in OFDM over the reference symbols). Then UE filters beam specific measurement samples according to higher layer configured filters (RRC provides filter coefficients which can set also the filter to non-existing value), point B. The UE uses filtered beam quality values for evaluating beam specific measurement reports C and initiated beam specific measurement report in point D.

Additionally, after getting filtered beam quality values the UE can calculate cell level quality value as depicted in FIG. 4, for determining trigger for measurement report for cell reporting events.

Thus, FIG. 4 provides illustration of a measurement model with different filtering procedures for cell and beam reporting. At each period of getting filtered beam measurement samples, the UE can calculate the cell level quality value using the following equation in point B2 in FIG. 4:

Cell RSRP=max(RSRP Beam1, . . . ,RSRP BeamN).

Other techniques can also be used, such as providing an average of the best two beams of a given cell, as opposed to the single best beam. Alternatively or additionally cell specific weighting could be applied when determining the cell level quality, for example when multiple beams are detected with over a specific threshold quality. As an example, a cell with two beams with quality levels above 'Qlevel1' (set by network or is predefined) may be ranked higher than a cell with one beam with quality above 'Qlevel1'. The number of beams may also be used to dynamically derive the weighting parameters for the layer 3 (or layer 2) filter determining the cell quality value.

The UE may apply additional layer 3 filtering at point B3 in FIG. 4 to obtain cell level quality value. The configured Layer 3 filtering for beam and layer 3 filtering for cell can be different from one another.

For each measured cell, the UE can maintain a similar cell quality value, such as cell reference signal received power (RSRP), when evaluating a cell mobility-reporting criteria for the duration of Time-to-Trigger (TTTcell) and using the same filtered samples to evaluate serving cell beam reporting criteria for the duration of TTTbeam.

Figure 5:
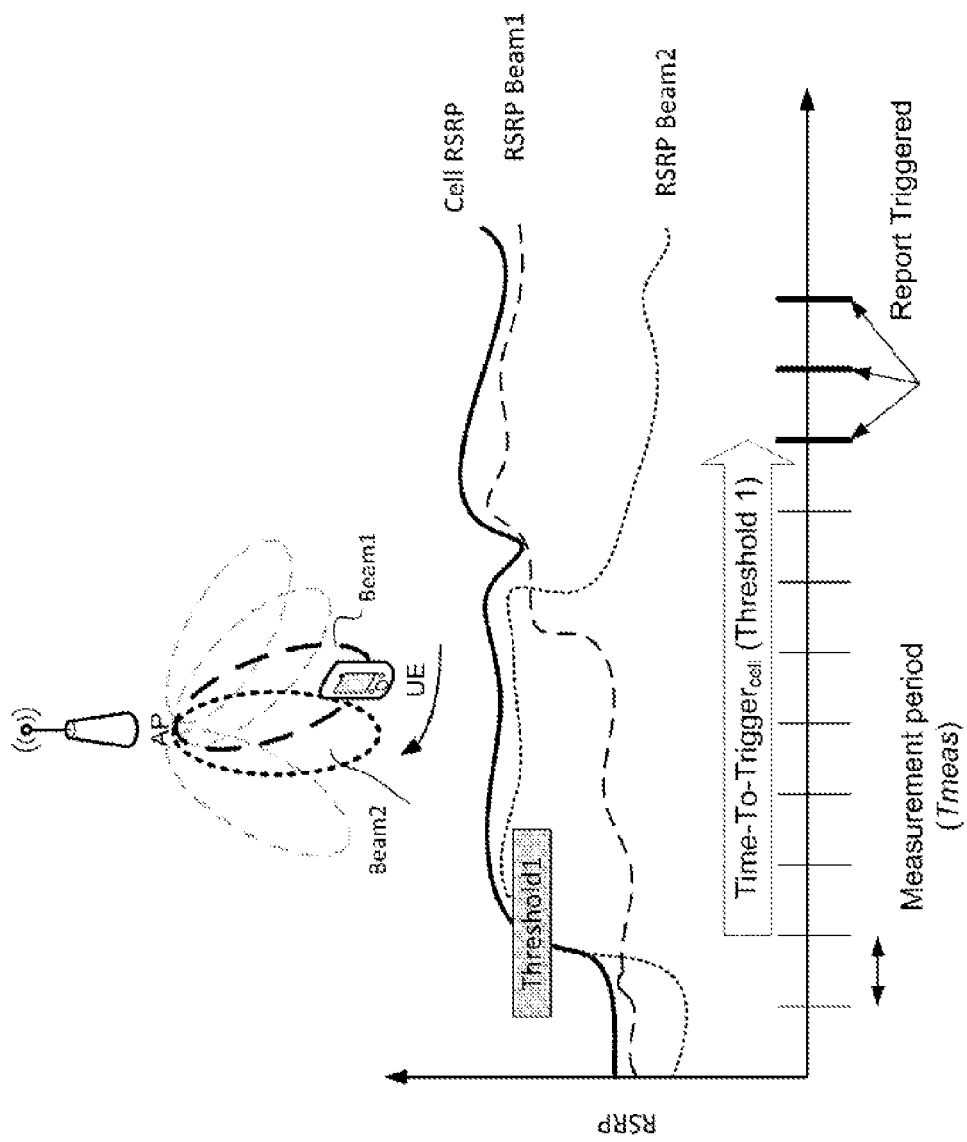
FIG. 5 illustrates cell quality calculation for time to trigger criteria, according to certain embodiments.

FIG. 5 illustrates cell RSRP calculation for time to trigger criteria, according to certain embodiments. As illustrated in FIG. 5, when the cell RSRP is above the predetermined threshold, a TTTcell timer can be started. The cell RSRP level can be compared to threshold1 on each measurement period (Tmeas) to determine if the measurement report criteria is fulfilled. The cell RSRP can reflect the maximum observed RSRP value during TTT and thus the criteria can be deemed fulfilled in the figure. This example may illustrate, for example, an event where a 'Serving Cell becomes better than threshold' or a 'neighbor cell becomes better than threshold.'

During the criteria evaluation, the UE compares only the 'Cell RSRP' but when it generates a measurement report, for example, in a case where 'Neighbor Cell2 becomes offset better than Serving Cell1' the measurement report can include the filtered beam index+filtered beam quality value of at least of Cell2. This report can be sent to serving cell1, which may utilize the report for evaluating the need for a cell changes to cell2 and further may provide such information to target cell2, or the report can be sent directly to cell2.

By using the same set of filtered beam measurement samples point C in FIG. 4, cell level beam reporting criteria can be evaluated. By now using different TTT values than for cell evaluation, the UE can react faster to the change of observed beam qualities and thus enable the network to maintain a so-called set of candidate beams. These beams can be used to communicate with the UE. The beam report may include a beam index and a quality value such as RSRP or RSRQ associated with the beam index. Other information may also be included in the beam report. Multiple beams may be reported, for example by reporting all the detected beams and quality values, or the N-best detected beams, or all detected beams having at least a threshold minimum quality.

Figure 6:
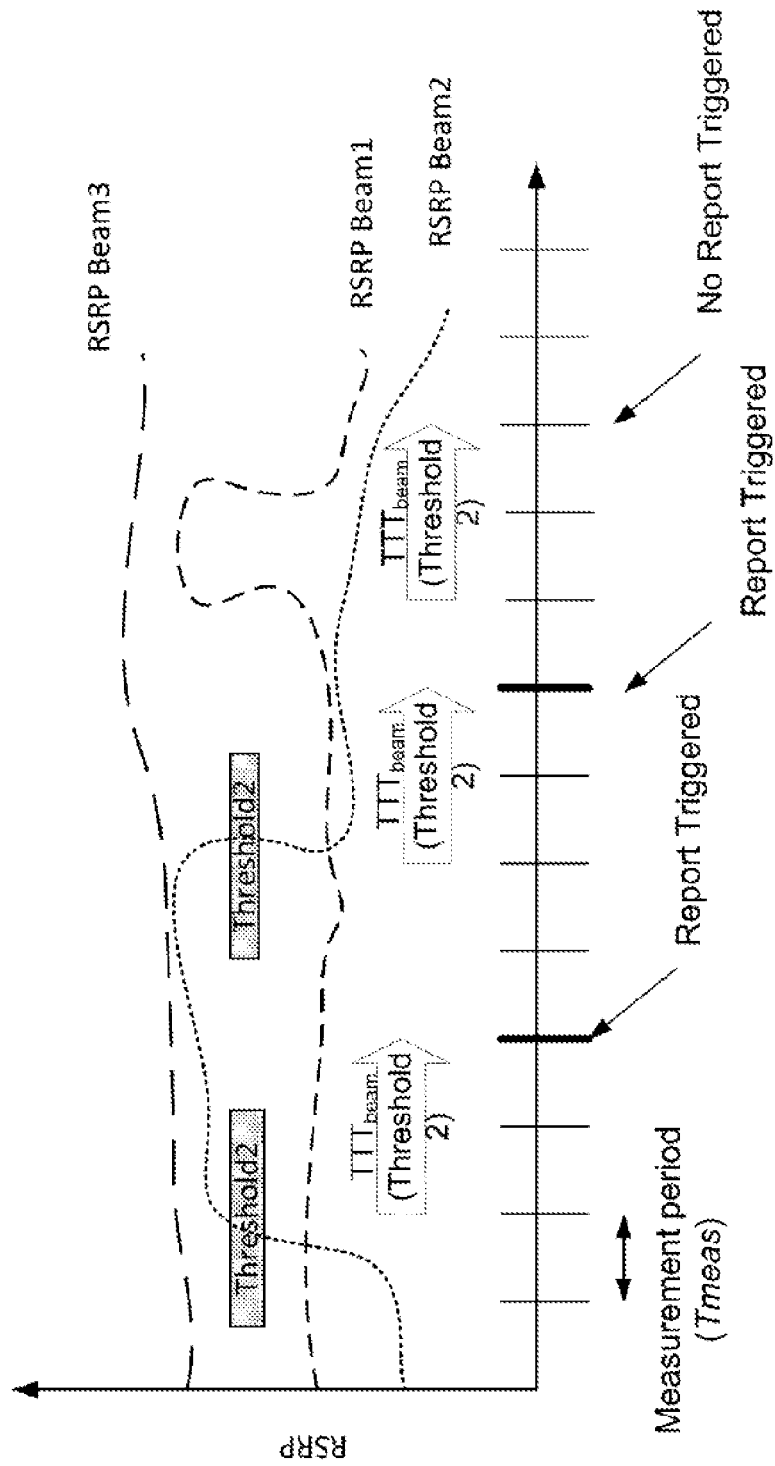
FIG. 6 illustrates beam specific time to trigger and report triggering based on a separate threshold, according to certain embodiments.

FIG. 6 illustrates TTTbeam and report triggering based on threshold2, according to certain embodiments. The following beam reporting events are illustrated in the FIG. 6. As shown in FIG. 6, beam2 can become better than a threshold2 which initiates TTTbeam. Additionally any offsets may be configured with the threshold2 so that TTTbeam is triggered when threshold2+offset criteria is met. Offset may be positive or a negative value. Threshold2 may be set by the network or may be derived based on the currently detected best filtered RSRP value of a beam.

Beam2 RSRP can be above threshold for duration of TTTbeam which then triggers measurement report. UE can report, for example, all beams above the threshold2 or N-best beams.

As shown in FIG. 6, beam2 becomes worse than threshold2 which initiates the TTTbeam. The beam2 RSRP stays below the threshold2 and thus a report is generated.

As shown in FIG. 6, beam1 detection initiates the TTTbeam but no report is triggered. As opposed to a case of reporting cell measurements, the TTTbeam may not trigger a periodic reporting but may be only a single measurement report.

Figure 7:
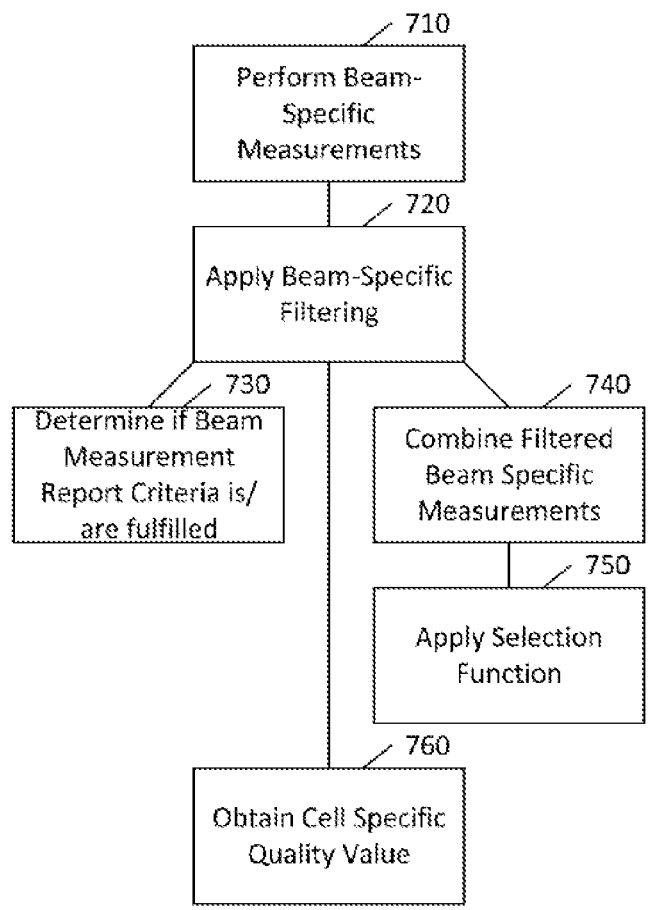
FIG. 7 illustrates a further method according to certain embodiments.

FIG. 7 illustrates a further method according to certain embodiments. The method of FIG. 7 can be viewed as an example of certain embodiments as discussed above, and as illustrated in FIG. 3 and FIG. 4.

As shown in FIG. 7, the method can include performing beam specific measurement results, at 710, and applying beam specific filtering (filter 1), at 720, on each beam. The beam specific filtered results can then be used, at 730, to determine if a beam measurement report criteria is fulfilled for serving cell filtered samples or other cell filtered samples. While the serving cell may be of interest in particular embodiments, other neighboring cells may similarly be of interest.

The method can additionally include combining the filtered beam specific measurements at 740 and applying a selection function at 750. The selection function may be, for example max RSRP or average of two or three best RSRP values. The filter coefficient can be modified such that if multiple high quality beams are detected, such a condition improves cell quality but only one value is derived out of filter 2.

Additionally, the method can include, at 760, obtaining a cell specific quality value by, for example, further filtering the beam specific filtered results using filter 2 for serving and adjacent cell or cells.

Such two-stage filtering may stabilize handover decisions, especially ones that involve RRC signaling. Other signaling may be UE context related signaling in a multi-cell environment where UE context/communication is transferred to another serving cell. A multi-cell environment may include, for example, a cluster of access-points under the same RRC or slave RRC. The first level of filtering can apply to serving cell beam management. Fast reacting filters can, for example, be applied as the network may need up-to-date beam information from the UE to perform scheduling decisions. If such measurements were used directly to determine handover there would be potentially excessive RRC signaling and frequent interruptions on service. Alternatively if a slowly reacting filter were used for serving cell beam level reporting, this would potentially cause link failure and excessive use of, for example, a random access procedure to recover from such failure. Such a slow filter may also impact NW scheduling decisions since the NW may not be able to optimize utilization of beam direction per transmission time interval.

Thus, certain embodiments may provide a system utilizing beamforming and beam specific reference signals. In such a system, firstly a two-stage filtering scheme may be applied. This filtering scheme may be accompanied by a corresponding two-stage report generation scheme, based on which stage(s) of the filtering triggers a report.

Moreover, certain embodiments may be applied not only to the case of inter-cell mobility, but also to the case of intra-cell mobility (intra-cell beam management). For example, the beam-specific measurements can be used to identify serving cell quality for the purposes of comparing to a neighboring cell, which may or may not employ beamforming itself. The beam-specific measurements can also be used to provide reports of better or comparable beams that the user equipment can detect. Thus, an access node or other network element configuring the user equipment may be able to make determinations regarding intra-cell mobility between, for example, various beams of a multi-beam cell.

In certain embodiments, the triggering of the two stages of filters may be somewhat independent and separate. For example, the two stages of filters can be used to trigger different reports on beam level/cell level so that a report type 1 may be triggered after a first stage but a report type 2 may not triggered after a second level of filtering, as these can be separate actions. These functions can run in parallel in the UE and can trigger two separate mobility actions, for example intra cell beam management and inter cell mobility, with different reports and trigger events. These functions and their reports can still be derived from the same measured samples. These two-stage filters can have an impact on, for example, service interruption time and signaling overhead.

Figure 8:
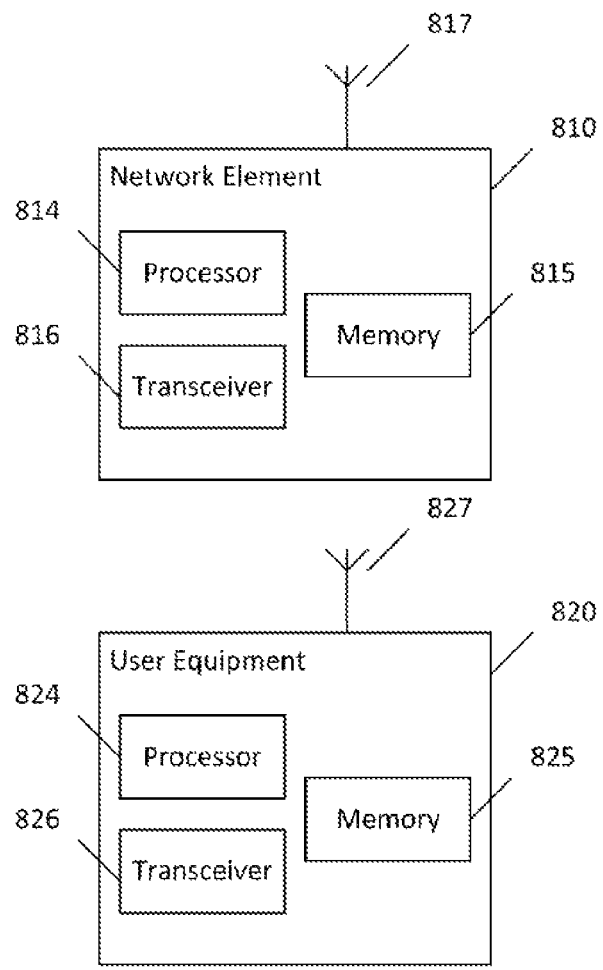
FIG. 8 illustrates a system according to certain embodiments.

FIG. 8 illustrates a system according to certain embodiments of the invention. It should be understood that each block of the flowchart of FIGS. 3 and 7 may be implemented by various means or their combinations, such as hardware, software, firmware, one or more processors and/or circuitry. In one embodiment, a system may include several devices, such as, for example, network element 810 and user equipment (UE) or user device 820. The system may include more than one UE 820 and more than one network element 810, although only one of each is shown for the purposes of illustration. A network element can be an access point, a base station, an eNode B (eNB), or any other network element, such as a PCell base station or an SCell base station. Network element may also refer to a another device in a device-to-device communication (D2D).

Each of these devices may include at least one processor or control unit or module, respectively indicated as 814 and 824. At least one memory may be provided in each device, and indicated as 815 and 825, respectively. The memory may include computer program instructions or computer code contained therein, for example for carrying out the embodiments described above. One or more transceiver 816 and 826 may be provided, and each device may also include an antenna, respectively illustrated as 817 and 827. Although only one antenna each is shown, many antennas and multiple antenna elements may be provided to each of the devices. Other configurations of these devices, for example, may be provided. For example, network element 810 and UE 820 may be additionally configured for wired communication, in addition to wireless communication, and in such a case antennas 817 and 827 may illustrate any form of communication hardware, without being limited to merely an antenna.

Transceivers 816 and 826 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. It should also be appreciated that according to the "liquid" or flexible radio concept, the operations and functionalities may be performed in different entities, such as nodes, hosts or servers, in a flexible manner. In other words, division of labor may vary case by case. One possible use is to make a network element to deliver local content. One or more functionalities may also be implemented as a virtual application that is provided as software that can run on a server.

A user device or user equipment 820 may be a mobile station (MS) such as a mobile phone or smart phone or multimedia device, a vehicle, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof. The user device or user equipment 820 may be a sensor or smart meter, or other device that may usually be configured for a single location.

In an exemplifying embodiment, an apparatus, such as a node or user device, may include means for carrying out embodiments described above in relation to FIGS. 3 and 7.

Processors 814 and 824 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors. Additionally, the processors may be implemented as a pool of processors in a local configuration, in a cloud configuration, or in a combination thereof.

For firmware or software, the implementation may include modules or units of at least one chip set (e.g., procedures, functions, and so on). Memories 815 and 825 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network element 810 and/or UE 820, to perform any of the processes described above (see, for example, FIGS. 3, 4, and 7). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments of the invention may be performed entirely in hardware.

Furthermore, although FIG. 8 illustrates a system including a network element 810 and a UE 820, embodiments of the invention may be applicable to other configurations, and configurations involving additional elements, as illustrated and discussed herein. For example, multiple user equipment devices and multiple network elements may be present, or other nodes providing similar functionality, such as nodes that combine the functionality of a user equipment and an access point, such as a relay node.

According to a first embodiment, a method can include performing, at a user equipment, beam-specific measurements of a plurality of beams of at least one cell. The method can also include calculating a cell quality based on the beam-specific measurements.

In a variant, the method can also include determining a value to trigger a beam-specific measurement report.

In a variant, the method can also include evaluating triggering a report based on cell qualities.

In a variant, the method can further include evaluating triggering a report based on beam qualities.

In a variant, the evaluating triggering the report based on the beam qualities can be performed separately from the evaluating triggering the report based on cell qualities.

In a variant, method can include configuring the user equipment to perform the beam-specific measurements.

In a variant, the configuring the user equipment can include receiving beam-specific filter coefficients.

In a variant, the configuring the user equipment can include receiving beam-specific trigger information.

In a variant, the configuring the user equipment can include receiving cell-specific trigger information.

In a variant, the configuring the user equipment can include configuring the user equipment to perform beam specific layer one filtering and higher layer filtering of physical layer measurements of the beam specific samples, and to calculate a cell quality level based on the filtered beam specific samples.

In a variant, the configuring the user equipment can include configuring the user equipment to perform a first layer of higher layer filtering and evaluation of the beam-specific measurements at layer 2 and to perform a second layer of higher layer filtering and evaluation of the beam-specific measurements at layer 3.

In a variant, the evaluation at layer 2 can trigger layer 2 measurement reports and the evaluation at layer 3 can trigger layer 3 measurement reports.

According to a second embodiment, a method can provide a user equipment with configuration for beam-specific measurements. The method can also include receiving cell quality level information from the user equipment based on the configuration for beam-specific measurements.

In a variant, the method can include configuring the user equipment with beam-specific filter coefficients.

In a variant, the method can include configuring the user equipment with beam-specific trigger information.

In a variant, the method can include configuring the user equipment with cell-specific trigger information.

In a variant, method can also include receiving beam quality level information based on the configuration for beam-specific measurements.

The method according to the second embodiment, in any of its variants, can be combined and used in combination with the method according to the first embodiment, in any of its variants.

According to third and fourth embodiments, an apparatus can include means for performing the method according to the first and second embodiments respectively, in any of their variants.

According to fifth and sixth embodiments, an apparatus can include at least one processor and at least one memory and computer program code. The at least one memory and the computer program code can be configured to, with the at least one processor, cause the apparatus at least to perform the method according to the first and second embodiments respectively, in any of their variants.

According to seventh and eighth embodiments, a computer program product may encode instructions for performing a process including the method according to the first and second embodiments respectively, in any of their variants.

According to ninth and tenth embodiments, a non-transitory computer readable medium may encode instructions that, when executed in hardware, perform a process including the method according to the first and second embodiments respectively, in any of their variants.

According to tenth and eleventh embodiments, a system may include at least one apparatus according to the third or fifth embodiments in communication with at least one apparatus according to the fourth or sixth embodiments, respectively in any of their variants.

The exemplary embodiments herein describe how a UE would perform intra-frequency cell ranking in multi beam system in UE based mobility. Typically, a UE based mobility has been a feature of IDLE mode (e.g. in LTE), but now this invention proposes that a UE would perform it also in INACTIVE mode.

Mechanisms described in the invention are also applicable for CONNECTED mode operation, e.g. when UE is configured to perform "conditional HO" (i.e. the HO with an early HO command and the condition which needs to be fulfilled in order to execute the actual HO) and has multiple cells with high quality beams to select from. This may be a non-trivial task to properly choose the best cell instantaneously by measuring and weighting the beams.

The following cell reselection methods, as specified in TS 36.304, and are most likely applicable for NR as well. A UE performs cell reselection based on the corresponding parameters broadcast while the UE is camping on a cell (receives information from network, e.g. system information and paging) in NR:

Intra-frequency reselection is based on ranking of cells;
Inter-frequency reselection is based on absolute priorities
Inter-RAT reselection can be also based on absolute priorities;
Frequency specific cell reselection parameters common to all neighboring cells on a frequency;
Service-specific prioritization, noting that for NR, it is FFS for which services the service specific prioritization is applied and how it could be applied for the case of network slices;
A concept of neighbor cell lists and black cell lists;
Speed dependent cell reselection.

In multi-beam operations, measurement quantity of a cell is derived from N best beams (N-best referring to the N highest quality beams based on measurement quantity such as RSRP, or RSRQ, SINR etc.) corresponding to the same cell where the value of N can be configured to 1 or more than 1. It is FFS on the details of filtering to be applied (e.g. for the case N=1, the best beam is filtered by a single filter as the best beam changes) and whether to only consider beams above a threshold (so-called "good beams").

For a cell ranking procedure in multiple beam system, a UE performs cell ranking between cells which RX-LVL (where RX-LVL is determined e.g. based on the RSRP, RSRQ or the like) are within a configured relative offset compared to the cell with highest RX-LVL by considering the contribution factor of number of high quality beams on each cell, where the high quality beams are determined based on NW configured parameters (e.g. another offset value). Beam quality evaluation may apply different filtering scheme compared to cell quality evaluation. The contribution factor is calculated based on the observed quality based on the configured threshold signal levels and time window. The cell with the higher number of high quality beams may rank that certain cell higher.

Figure 9:
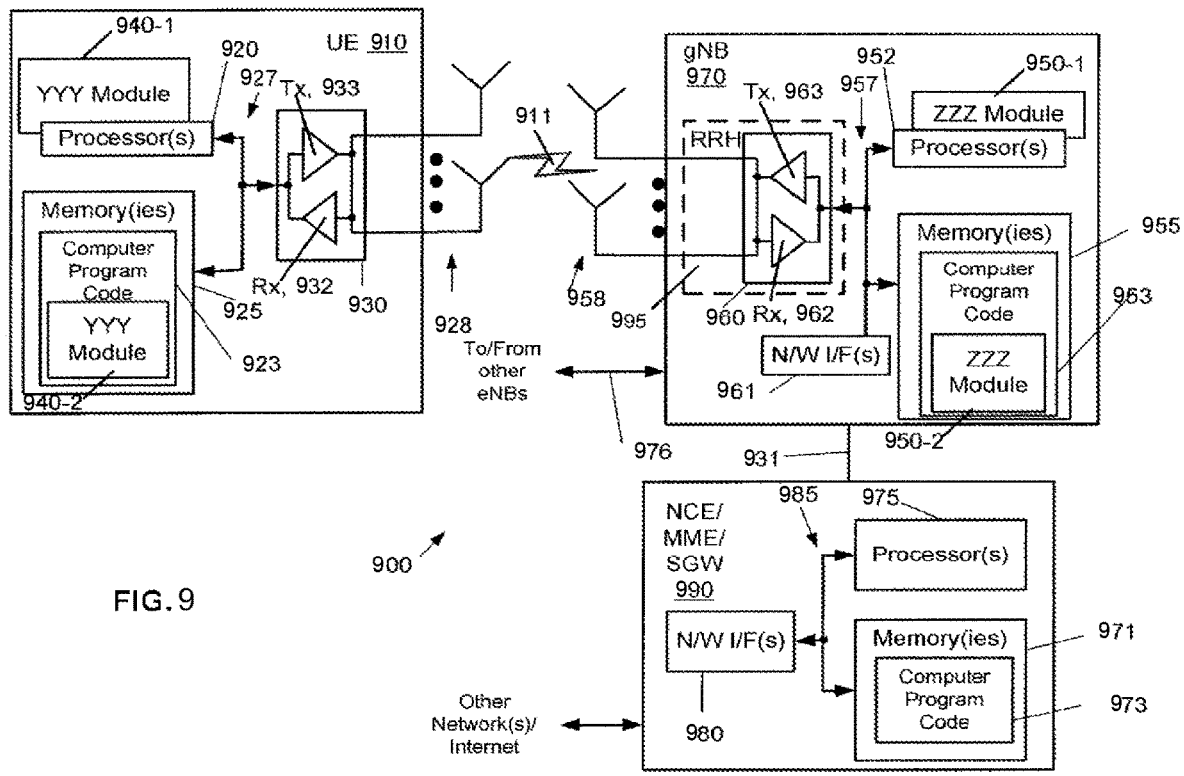
FIG. 9 is a block diagram of an exemplary system in which the exemplary embodiments may be practiced.

Turning to FIG. 9, this figure shows a block diagram of one possible and non-limiting exemplary system in which the exemplary embodiments may be practiced. In FIG. 9, a user equipment (UE) 910 is in wireless communication with a wireless network 900. A UE is a wireless, typically mobile device that can access a wireless network. The UE 910 includes one or more processors 920, one or more memories 925, and one or more transceivers 930 interconnected through one or more buses 927. Each of the one or more transceivers 930 includes a receiver, Rx, 932 and a transmitter, Tx, 933. The one or more buses 927 may be address, data, or control buses, and may include any interconnection mechanism, such as a series of lines on a motherboard or integrated circuit, fiber optics or other optical communication equipment, and the like. The one or more transceivers 930 are connected to one or more antennas 928. The one or more memories 925 include computer program code 923. The UE 910 includes a YYY module 940, comprising one of or both parts 940-1 and/or 940-2, which may be implemented in a number of ways. The YYY module 940 may be implemented in hardware as YYY module 940-1, such as being implemented as part of the one or more processors 920. The YYY module 940-1 may be implemented also as an integrated circuit or through other hardware such as a programmable gate array. In another example, the YYY module 940 may be implemented as YYY module 940-2, which is implemented as computer program code 923 and is executed by the one or more processors 920. For instance, the one or more memories 925 and the computer program code 923 may be configured to, with the one or more processors 920, cause the user equipment 910 to perform one or more of the operations as described herein. The UE 910 communicates with gNB 970 via a wireless link 911.

The gNB (NR/5G Node B but possibly an evolved NodeB) 170 is a base station (e.g., for LTE, long term evolution) of the set of base stations available to the UE 910 that provides access by wireless devices such as the UE 910 to the wireless network 900. The gNB 970 includes one or more processors 952, one or more memories 955, one or more network interfaces (N/W I/F(s)) 961, and one or more transceivers 960 interconnected through one or more buses 957. Each of the one or more transceivers 960 includes a receiver, Rx, 962 and a transmitter, Tx, 963. The one or more transceivers 960 are connected to one or more antennas 958. The one or more memories 955 include computer program code 953. The gNB 970 includes a 77Z module 950, comprising one of or both parts 950-1 and/or 950-2, which may be implemented in a number of ways. The ZZZ module 950 may be implemented in hardware as ZZZ module 950-1, such as being implemented as part of the one or more processors 952. The ZZZ module 950-1 may be implemented also as an integrated circuit or through other hardware such as a programmable gate array. In another example, the ZZZ module 950 may be implemented as ZZZ module 950-2, which is implemented as computer program code 953 and is executed by the one or more processors 952. For instance, the one or more memories 955 and the computer program code 953 are configured to, with the one or more processors 952, cause the gNB 970 to perform one or more of the operations as described herein. The one or more network interfaces 961 communicate over a network such as via the links 976 and 931. Two or more gNBs 970 communicate using, e.g., link 976. The link 976 may be wired or wireless or both and may implement, e.g., an X2 interface.

The one or more buses 957 may be address, data, or control buses, and may include any interconnection mechanism, such as a series of lines on a motherboard or integrated circuit, fiber optics or other optical communication equipment, wireless channels, and the like. For example, the one or more transceivers 960 may be implemented as a remote radio head (RRH) 995, with the other elements of the gNB 970 being physically in a different location from the RRH, and the one or more buses 957 could be implemented in part as fiber optic cable to connect the other elements of the gNB 970 to the RRH 995.

It is noted that description herein indicates that "cells" perform functions, but it should be clear that the gNB that forms the cell will perform the functions. The cell makes up part of a gNB. That is, there can be multiple cells per gNB.

The wireless network 900 may include a network control element (NCE) 990 that may include MME (Mobility Management Entity)/SGW (Serving Gateway) functionality, and which provides connectivity with a further network, such as a telephone network and/or a data communications network (e.g., the Internet). The gNB 970 is coupled via a link 931 to the NCE 990. The link 931 may be implemented as, e.g., an S1 interface. The NCE 990 includes one or more processors 975, one or more memories 971, and one or more network interfaces (N/W I/F(s)) 980, interconnected through one or more buses 985. The one or more memories 171 include computer program code 973. The one or more memories 971 and the computer program code 973 are configured to, with the one or more processors 975, cause the NCE 990 to perform one or more operations.

The wireless network 900 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 952 or 975 and memories 955 and 971, and also such virtualized entities create technical effects.

The computer readable memories 925, 955, and 971 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 925, 955, and 971 may be means for performing storage functions. The processors 920, 952, and 975 may be of any type suitable to the local technical environment, and may include one or more of general purpose computers, special purpose computers, microprocessors, digital signal processors (DSPs) and processors based on a multi-core processor architecture, as non-limiting examples. The processors 920, 952, and 975 may be means for performing functions, such as controlling the UE 910, gNB 970, and other functions as described herein.

In general, the various embodiments of the user equipment 910 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

Embodiments herein may be implemented in software (executed by one or more processors), hardware (e.g., an application specific integrated circuit), or a combination of software and hardware. In an example of an embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 9. A computer-readable medium may comprise a computer-readable storage medium or other device that may be any media or means that can contain or store the instructions for use by or in connection with an instruction execution system, apparatus, or device, such as a computer.

The current architecture in LTE networks is fully distributed in the radio and fully centralized in the core network. The low latency requires bringing the content close to the radio which leads to local break out and multi-access edge computing (MEC). 5G may use edge cloud and local cloud architecture. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services and augmented reality. In radio communications, using edge cloud may mean node operations to be carried out, at least partly, in a server, host or node operationally coupled to a remote radio head or base station comprising radio parts. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

One possible manner to carry out embodiments described herein is with an edge cloud using a distributed computing system. An exemplary embodiment comprises a radio node connected to a server. Exemplary embodiments implementing the system allow the edge cloud server and the radio node as stand-alone apparatuses communicating with each other via a radio path or via a wired connection or they may be located in a same entity communicating via a wired connection.

Figure 10:
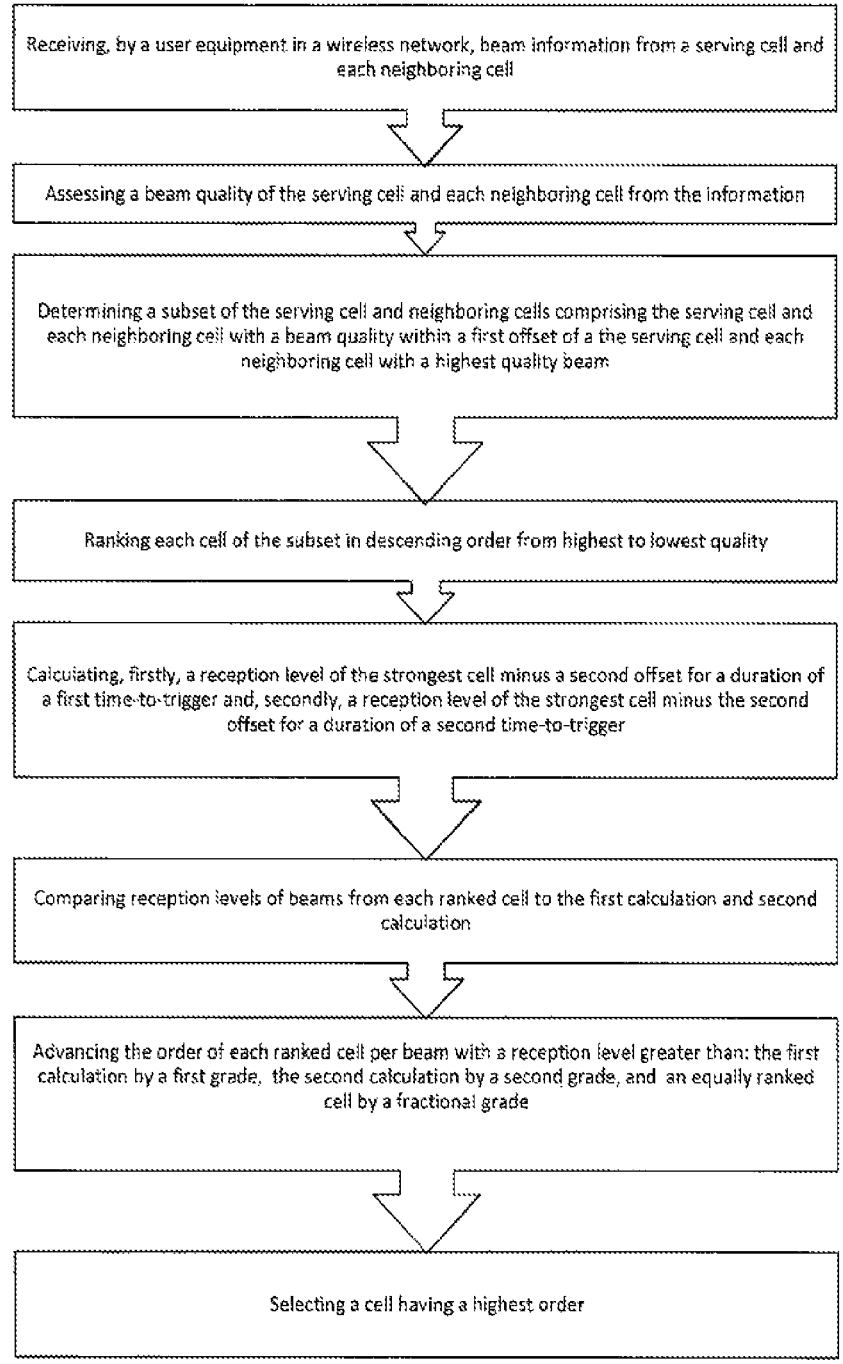
FIG. 10 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible.

FIG. 10 is a logic flow diagram illustrating the operation of an exemplary method or methods, resulting from an execution of computer program instructions embodied on a computer readable memory, and/or functions performed by logic implemented in hardware or other means, in accordance with exemplary embodiments, which would be possible. Cell quality (RX-LVL) is based on the RX-LVL of the highest quality beam (RSRP of SS block/CSI-RS), although other measurement quantities are not precluded by the algorithm. Cell quality (RX-LVL) may refer to the L3 filtered (e.g. moving average such as defined in LTE) cell quality or cell quality that is not L3 filtered.

The proposed ranking procedure comprises the following three steps.

In step 1, the UE determines the highest quality cell (e.g. Cell1) and determines whether any cell from the subset of Cell2 through CellN qualities is within Offset_1 of the Cell1 (N dB). If no cells are within the Offset_1 (i.e. relative threshold), then the highest quality cell is ranked first and Cell2 through CellN are ranked according to a descending order based on quality. If any of the cells are within the Offset_1 of highest quality cell, then it is considered for second step. All other cells are ranked in descending order based on quality.

In step 2, for all the cells that are within the Offset_1 in Step 1, the UE determines the number of HighQuality beams based on the higher layer (e.g. L2/L3, moving average filter) filtered beam measurements. Higher layer beam filtering, such as moving average is used to filter L1 measurements (L1 measurement e.g. RSRP may consist of N-L1 samples). In moving average filtering, previous filtered measurement result is weighted with weight_1 and the latest received measurement result is weighted with weight_2. As an example, weights can be selected so that weight_1=alpha and weight_2=1-alpha. Filtering parameters that are used to calculate alpha may be configurable by network.

The UE utilizes TTT_1 and Offset_2 to determine if a beam is classified as HighQuality. Offset_2 is compared against the highest quality beam of the highest quality cell, determined in Step 1. Offset_2 may also be same as Offset_1 in Step 1. If a beam RX-LVL>Cell_1 RX-LVL-Offset_2 for the duration of (at least, meaning equal time or longer) TTT_1, then it contributes, +1 for example, to the overall cell rank (TTT_1 can be also set to '0' so that e.g. based on one measurement (or the latest measurement or measurement result) the beam contributes the specified value to cell rank such as +1). TTT_1 parameter may also be omitted from this step which causes the cell ranking to be based on the latest measurements similarly as TTT_1 would be set to '0'. This measurement may be a L1 measurement (i.e. only L1 filtering is applied) or the latest higher layer filtered measurement result. Additionally, if a beam RX-LVL>Cell_1 RX-LVL-Offset_2 for duration of TTT_2, then it contributes e.g. +2 to the overall cell rank. Note that the Offset_2 may not be defined in the algorithm at all and so the Offset_1 would be used instead. In similar manner TTT_2 may not be used i.e. beam would contribute to cell rank single value based on TTT_1. The increase in cell ranks would be for each high quality beam, i.e. 2 cells that have highest quality beam inside within the offset_1 are compared based on the number of the high quality beams.

The first offset can be defined as relative threshold compared to the highest quality beam of the serving cell and neighbor cells and used to determine which cells are considered for ranking based on high quality beams. Offset is expressed as decibels. This value may be signaled by network explicitly e.g. −2, −1, 0, 1, 2, 3, 4 dBs or given as a factor (integer −1, 0, 1, 2, 3 . . . to be multiplied with a specific number such as 0.5 dB.

The second offset can be defined as a relative threshold compared to the highest quality beam of serving and neighbor cells and used for determining high quality beams that contribute to an individual cell's overall rank. Alternatively, the second offset might not defined and the first offset would be used in place of the second offset. As another alternative, the second offset is equal to the first offset.

The first time-to-trigger is defined as the minimum time duration that a beam reception level (higher layer filtered/non higher layer filtered) must be above the relative threshold defined by Offset_1 (or Offset_2 if defined) so that it contributes to the cell rank.

The second time-to-trigger is defined as the minimum time duration that a beam reception level (higher layer filtered/non higher layer filtered) must be above the relative threshold defined by Offset_1 (or Offset_2 if defined) so that it contributes different value (e.g. higher) to the cell rank than per the first time-to-trigger.

In one further example, a specific Hysteresis value (H1) may be defined so that the beam RX-LVL equation can be written as RX-LVL>Cell_1 RX-LVL-Offset_1+H1. H1 may be a positive or negative number (expressed in dBs, and can be also zero) and configured by network.

In a variant, a beams contribution to cell rank may scale also in following manner: TTT_1 is considered as default value and if the condition for beam RX-LVL>Cell_1 RX-LVL-Offset_2 is fulfilled for duration of K*TTT 1 and K is integer then each TTT 1 duration adds+1 to cell rank so that K*+1 would be added to the cell rank. There may be a defined cap for the contribution value e.g. one beam can contribute up to value '5'.

In step 3, the Cells are ranked according to the points assigned in Step 2 in descending order, i.e. cell with the highest number of points is ranked highest. In case two cells are ranked with same value, according to points, the highest quality beam RX-LVL determines the rank between the equally ranked cells.

Thus, a cell is selected where that cell would have the highest final rank. That selecting could be for a conditional handover or for reselecting a cell for camping, where the UE possibly sends some indication to the base station for that cell where the UE receives a transmission from that base station in response.

The above parameters such as the contribution to cell rank (+1, +1.5, +2) etc. may be predefined in the specification (e.g. 3GPP) or signaled to UE via broadcast (system information) or dedicated signaling (RRC). Also, additionally or alternatively, the different set of parameters may be configured to UE based on which signal is used (e.g. SS block/CSI-RS). Parameters are common for all the cells is not explicitly configured with cell specific values.

In a variant, the cell ranking procedure may use in step 2 an alternative or additional interpretation of the configured offset (Offset_1, Offset_2) value so that higher the beam signal reception level (and closer the value to the highest quality beam reception level of all the cells) the higher the contribution value to cell rank. As an example, Offset_1 is configured with value of 3 dB. A beam with 3 dB lower reception level would contribute+1, a beam with 2 dB lower+2 and beam with 1 dB lower or the same would contribute+3. These are only one set of example values. This method can be used in conjunction with the TTT values.

In one example, the network may configure UE to perform the previously described ranking for cells that have been configured for UE for conditional HO. Based on the ranking UE would perform conditional HO to the highest ranked cell when triggers conditions are fulfilled i.e. a cell or multiple cell quality is offset better than current serving. Other conditions are not precluded.

In yet another example, UE may use the cell ranking when it is configured to report N-highest quality cell to network, or determine which cells UE prioritizes RRM (Radio Resource Management)/mobility measurements.

In yet another example, the cell ranking method can be applied for intra-cell mobility measurements/beam management where UE ranks different SS blocks of a serving cell (or multiple cells) for reporting based on the CSI-RS measurements (beams) of specific SS block. UE is given the association of specific CSI-RS and SS blocks via broadcast signaling (SIB, system information block) or via dedicated RRC signaling.

Although various aspects are set out above, other aspects comprise other combinations of features from the described embodiments, and not solely the combinations described above. If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

Without in any way limiting the scope, interpretation, or application of the claims appearing below, an advantage or technical effect of one or more of the exemplary embodiments disclosed herein is the added functionality.

It is also noted herein that while the above describes example embodiments of the invention, these descriptions should not be viewed in a limiting sense. Rather, there are several variations and modifications which may be made without departing from the scope of the present One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention.

The invention claimed is:

1. A method comprising:
    determining, by a user equipment in a wireless network, a highest quality cell from a plurality of cells;
    determining, by the user equipment, a subset of cells from the plurality of cells, wherein the quality of each cell of the subset are within a configured relative offset of a quality of the highest quality cell;
    determining, for each cell of the subset of cells having qualities within the configured relative offset of the quality of the highest quality cell, a number of high quality beams based on a configured parameter; and
    selecting, from the subset of cells having qualities within the configured relative offset of the quality of the highest quality cell, a cell having a highest number of high quality beams.

2. The method of claim 1, wherein the configured parameter comprises a threshold, and wherein determining the number of high quality beams comprises determining the number of beams having a quality above the threshold.

3. The method of claim 1, wherein the plurality of cells comprises a serving cell and one or more neighboring cells.

4. The method of claim 1, wherein the relative offset and the parameter are configured by a network node in the wireless network.

5. The method of claim 1, wherein the determining the number of high quality beams comprising measuring each beam with filtered beam measurements.

6. The method of claim 1, wherein the determining the number of high quality beams utilizes a first time period to determine whether a beam is a high quality beam, and wherein the first time period is defined as the minimum time duration that a beam reception level is above a threshold.

7. The method of claim 6, wherein determining the number of high quality beams further utilizes a second time period, wherein the second time period is defined as the minimum time duration that a beam reception level is above a threshold so that it contributes different value to the cell rank than per the first time period.

8. The method of claim 1, further comprising: ranking the subset of cells based on the determined number of high quality beams.

9. The method of claim 1, where the selecting is for a conditional handover or comprises reselecting a cell for camping.

10. An apparatus comprising:
    at least one processor and at least one memory including computer program code, wherein the at least one memory and the computer code are configured to, with the at least one processor, cause the apparatus to at least:
    determine a highest quality cell from a plurality of cells;
    determine a subset of cells from the plurality of cells, wherein the quality of each cell of the subset are within a configured relative offset of a quality the highest quality cell;
    determine, for each cell of the subset of cells having qualities within the configured relative offset of the quality of the highest quality cell, a number of high quality beams based on a configured parameter; and
    select, from the subset of cells having qualities within the configured relative offset of the quality of the highest quality cell, a cell having a highest number of high quality beams.

11. The apparatus of claim 10, wherein the configured parameter comprises a threshold, and wherein the apparatus is caused to determine the number of high quality beams by determining the number of beams having a quality above the threshold.

12. The apparatus of claim 10, wherein the plurality of cells comprises a serving cell and one or more neighboring cells.

13. The apparatus of claim 10, wherein the relative offset and the parameter are configured by a network node in the wireless network.

14. The apparatus of claim 10, wherein the determining the number of high quality beams comprising measuring each beam with filtered beam measurements.

15. The apparatus of claim 10, wherein the determining the number of high quality beams utilizes a first time period to determine whether a beam is a high quality beam, and wherein the first time period is defined as the minimum time duration that a beam reception level is above a threshold.

16. The apparatus of claim 15, wherein determining the number of high quality beams further utilizes a second time period, wherein the second time period is defined as the minimum time duration that a beam reception level is above a threshold so that it contributes different value to the cell rank than per the first time period.

17. The apparatus of claim 10, wherein the apparatus is further caused to:
    rank the subset of cells based on the determined number of high quality beams.

18. The apparatus of claim 10, where the selecting is for a conditional handover or comprises reselecting a cell for camping.

19. An apparatus comprising:
    at least one processor and at least one memory including computer program code, wherein the at least one memory and the computer code are configured to, with the at least one processor, cause the apparatus to at least:
    send a configured relative offset to a user equipment, wherein the configured relative offset causes the user equipment to determine a subset of cells from a plurality of cells, wherein the quality of each cell of the subset are within the configured relative offset of a quality of a highest quality cell; and
    send a configured parameter to the user equipment, wherein the configured parameter causes the user equipment to select, from the subset of cells having qualities within the configured relative offset of the quality of the highest quality cell, a cell having a highest number of high quality beams, and wherein a number of high quality beams is determined based on the configured parameter.

20. The apparatus of claim 19, wherein the configured parameter comprises a threshold, and wherein the number of high quality beams is determined based on the number of beams having a quality above the threshold.

* * * * *